United States Patent [19]

Chow

[11] Patent Number: 5,439,119

[45] Date of Patent: Aug. 8, 1995

[54] CD STORAGE AND DISPLAY SYSTEM

[75] Inventor: Tat C. Chow, Kowloon, Hong Kong

[73] Assignee: Sin Hing Audio Equipment Manufactory Limited, Hong Kong

[21] Appl. No.: 192,746

[22] Filed: Feb. 7, 1994

[30] Foreign Application Priority Data

May 14, 1993 [GB] United Kingdom ............... 9309953

[51] Int. Cl.$^6$ .................................................. A47F 7/00
[52] U.S. Cl. ........................................ 211/49.1; 211/40; 211/194
[58] Field of Search ................ 211/49.1, 40, 41, 168, 211/194; 312/9.58, 9.9, 298, 300; 206/308.1; D6/630, 407

[56] References Cited

U.S. PATENT DOCUMENTS

| 3,498,471 | 3/1970 | Dirky | 211/163 X |
|---|---|---|---|
| 4,358,018 | 11/1982 | Wolfe | 211/163 |
| 5,344,028 | 9/1994 | Angele | 211/168 |
| 5,370,244 | 12/1994 | Peng | 211/412 |
| 5,385,397 | 1/1995 | Chow | 211/40 |

FOREIGN PATENT DOCUMENTS

WO92/22902 6/1992 WIPO .

Primary Examiner—Ramon O. Ramirez
Assistant Examiner—Sarah L. Purol

[57] ABSTRACT

A storage rack is described consisting of a base (112), a substantially vertical support rod (116) and a plurality of storage clips (120) rotatably mounted on the rod. Each clip is adapted to retain the corner of a CD-case (14) lying in a predetermined first plane relative thereto and to permit the CD-case so retained to be opened. The clip (120) is arranged so that the retained CD-case (14) and the axis of rotation (150) of the clip about the support rod are so positioned relative to one another that rotation by no more than about 90° is sufficient to remove a CD-case (14') from the stack and enable it to be opened. The clips (120) consist of a support shelf (130), first (122) and second (124) retaining walls which engage the edges of the CD-case and a cantilevered gripping member (118) which grips the hinge region of the case. Rotation by no more than about 90° enables the rack to be used where space is at a premium and also means that the printed matter in a swung-out CD-case (14') runs, from a user's point of view, from left to right, enabling convenient verification that the correct choice has been made.

14 Claims, 5 Drawing Sheets

CD STORAGE AND DISPLAY SYSTEM

This invention relates to storage racks for compact discs and in particular to racks comprising a base, an elongate, vertical support and a plurality of storage clips rotatably mounted on the support. Each clip retains a CD-case and can be individually rotated about the support allowing the easy location and removal of any CD in a short space of time.

With the continued popularity of the CD, a number of storage racks of the type described above are now available. One such rack is described and illustrated in WO92/22902. Each of the clips is designed to grip the hinge region of a CD-case, i.e. the region of the case adjacent to its spine where the hinged lid is cut away. This arrangement enables the CD-case to be opened while it is retained in the clip, since the clip will not interfere with any parts of the lid. The clips may be positioned anywhere on the hinge region of a CD-case, other than at either end, since they would there interfere with the lateral sides of the hinged lid and prevent the case from being opened. The existing designs of clip include a lug with a cylindrical hole passing through it, by means of which a plurality of clips may be mounted upon a vertical support rod. The lug is positioned centrally on the clip.

These existing storage racks possess a number of disadvantages. Firstly, since the clip is designed to grip the hinge region of the CD-case, the support rod on which it is mounted, and indeed the clip itself, obscures to some extent the spine of the CD-case. Since it is upon the spine of the case that details of the recorded music are printed, this can sometimes make it difficult to identify a particular CD.

A second disadvantage with the known designs is that, swinging a selected CD-case sufficiently about the support rod to enable it to clear neighbouring CDs and thus be opened, requires rotation by approximately 180°. This means that the storage rack requires an amount of floor—or table—space which is rather larger than may be expected, so that there is sufficient clearance to allow this 180° rotation to take place. A further disadvantage of 180° rotation is that the user, having selected by viewing the spine the CD which he wishes to play and then rotated the appropriate case out of the rack to enable it to be opened, will then have a view of the front face of the CD-case in which the printed matter runs from top to bottom as he looks at it, rather than from left to right. Since one would normally glance at the front face of the CD-case to verify that one has selected the correct CD, this orientation of the printed matter can be inconvenient.

It is an object of this invention to provide a storage and display rack for CDs which does not suffer from the above disadvantages and a storage clip for which use with such a rack.

Accordingly, the invention provides a storage clip adapted to receive and retain the corner of a CD-case lying in a predetermined first plane relative thereto and to permit the CD-case so retained to be opened, the clip being adapted to form a stack with a plurality of identical clips such that the clips are rotatable relative to one another about a common axis substantially normal to the said plane, wherein a second predetermined plane containing the said axis and making an angle of 45° with the edges of the CD-case so retained which meet at the said corner, does not pass through the CD-case itself.

The invention also provides a storage stack comprising a plurality of clips, rotatable relative to one another about a common axis, each clip being adapted to receive and retain the corner of a CD case lying in a predetermined first plane substantially normal to the said axis and to permit the CD case so retained to be opened, and wherein a second predetermined plane containing the said axis and making an angle of 45° with the edges of the CD-case so retained which meet at the said corner, does not pass through the CD-case itself.

As will be explained below with reference to FIG. 2 of the accompanying drawings, this arrangement provides for a rack which is substantially free from the disadvantages discussed above with respect to existing racks and in which a CD-case need be rotated relative to its neighbours by about 90°, possibly a little more, before it can be opened.

In order that the printed matter, visible on the front face of a CD-case which has been rotated out of the rack or stack sufficiently to enable it to be opened, reads from left to right from the user's point of view, it is preferred that a CD-case so retained in any one clip of the stack may be opened, unobstructed by adjacent clips and/or retained CD-cases, once the said one clip has been rotated by 90° relative to its neighbours.

Preferably, the or each clip includes a shelf lying in the first plane and a gripping member cantilevered relative to the shelf and adapted to grip the hinge region of a CD-case to retain the CD-case in the clip.

To aid in the positive location of the CD-case within the or each clip, it is preferred that the or each clip include a first retaining wall substantially perpendicular to and attached to the shelf and adapted to engage a lateral edge of a retained CD-case. It is similarly preferred that the or each clip include a second retaining wall substantially perpendicular to both the first retaining wall and the shelf and attached to the latter, adapted to engage the spine of a retained CD-case and from which the gripping member is cantilevered.

So as not to interfere with a lateral side wall of the lid of a retained CD-case, when the case is being opened, the gripping member should be spaced from the first retaining wall.

To allow the relatively simple construction of a rack, it is preferred that the or each clip be adapted to engage an elongate support for rotation about a longitudinal axis of the support, coincident with the said common axis. A stack according to the invention may then include such an elongate support.

Preferably, the or each clip includes an attachment lug with a substantially cylindrical hole centred on the said axis passing through it. The elongate support may then comprise a support rod.

The invention also encompasses a storage rack comprising a base and a stack as above, the elongate support being attached to the base and being substantially vertical at rest. Similarly, a storage rack is provided comprising a base and a plurality of stacks as above, the elongate supports being arranged around and attached to the base and being substantially vertical at rest. Preferably, the rack includes a central column, substantially vertical at rest, against which a CD-case retained in any clip in the said plurality of stacks can impinge to define its stored position.

The present invention will now be described by way of example with reference to the accompanying drawings, wherein:

FIG. 1 a schematic plan view of an existing CD-rack;

Figure 1:
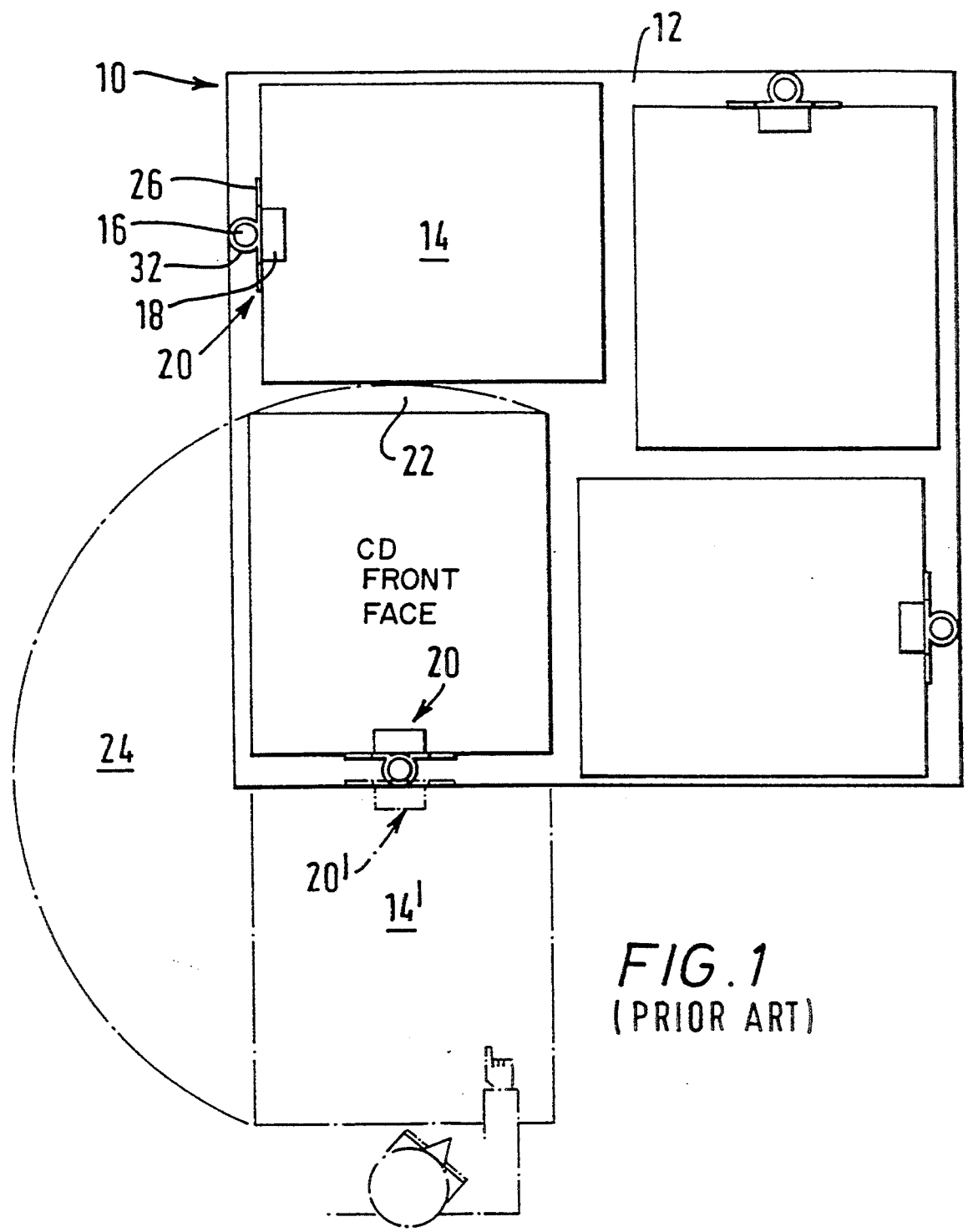

As can been seen from FIG. 1, CD-racks are known which consist of a base 12 and a plurality of substantially vertical support rods 16. Upon each rod 16 are mounted a plurality of storage clips 20. Each of the clips consists of a shelf (not shown), which supports a CD-case 14 from below, a retaining wall 26 and a gripping member 18, cantilevered from the retaining wall 26. The hinge region of the CD-case 14 is gripped between the gripping member 18 and the shelf. Each of the clips 20 includes an attachment lug 32 with a cylindrical hole passing through it, a respective support rod 16 being received within the cylindrical hole.

As can be seen, each of the support rods 16, being centred on the spine of the retained CD-cases 14, obscures the view of the printed matter on the spine. Furthermore, rotation of a selected CD-case so that it clears the neighbouring CD-cases and is therefore able to be opened, requires a swing of almost 180°. A swung-out clip 20' and CD-case 14' are illustrated. As can be seen, the 180° swing necessitates a minimum clearance 22 between adjacent stacks of CD-cases and a certain amount of external clearance 24, to enable the rack to be used. It can also be seen that the printed matter on the front face of the swung-out CD-case 14' runs from top to bottom, from the user's point of view, rather than from left to right, as would be best.

The embodiment illustrated includes four support rods 16, but it will be understood that this is an exemplary embodiment and that the rack may include one, two, three or more support rods 16.

Figure 2:
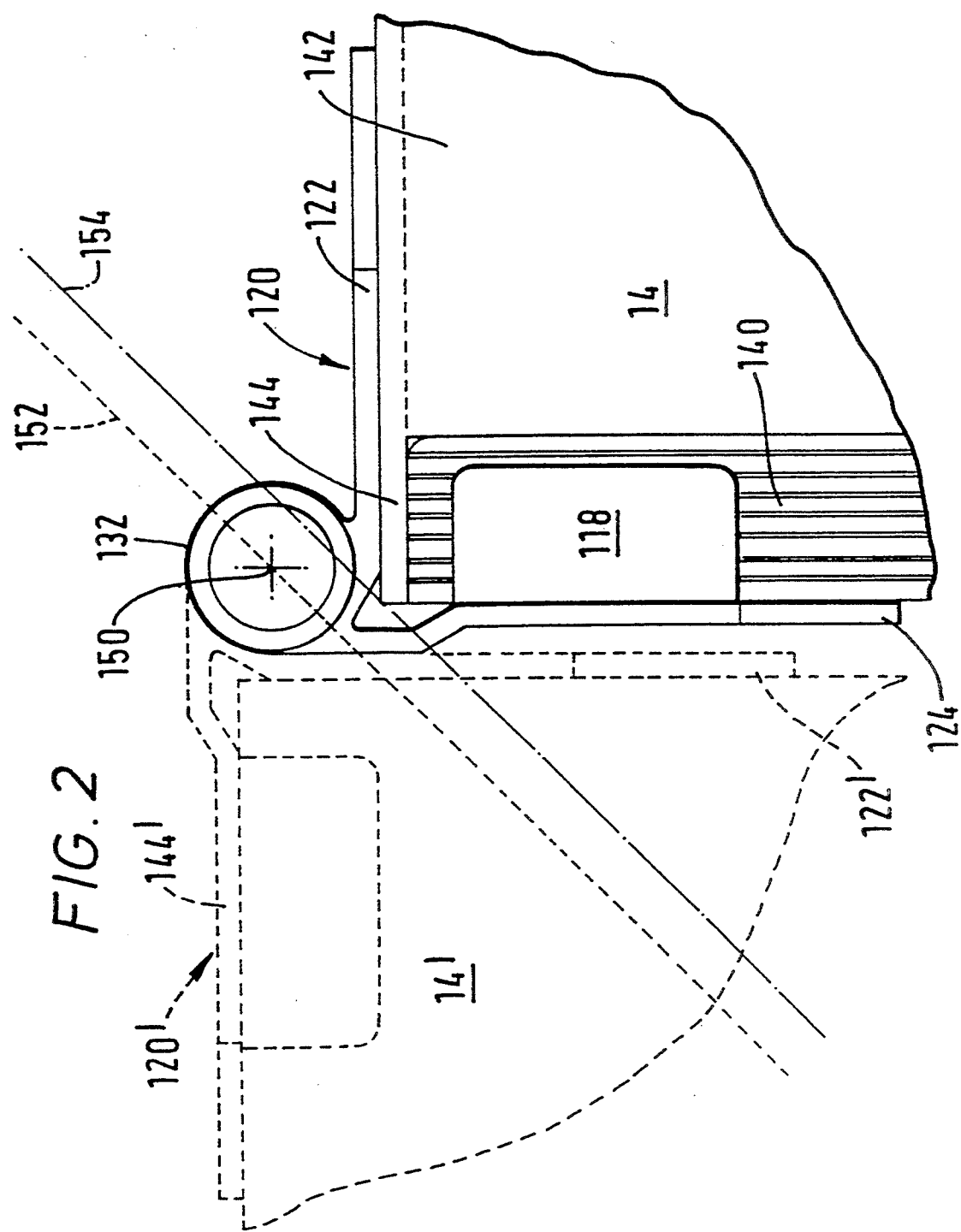
FIG. 2 is a schematic drawing illustrating the general concept underlying the present invention.

With reference to FIG. 2, the fundamental inventive concept underlying the present invention will now be described.

FIG. 2 is a schematic illustration of a storage clip 120 according to the invention with a CD-case 14 retained therein. The clip 120 includes a shelf (not shown), which supports the CD-case from below, first and second retaining walls 122, 124 which engage the lateral edge and the spine of the CD-case 14 and a gripping member 118, cantilevered from the second retaining wall 124. The clip includes an attachment lug 132 with a cylindrical hole passing through it. The cylindrical hole is centred on an axis 150, which is the axis about which the clip 120 is rotated once a CD has been selected. Illustrated in phantom is a clip 120' and a CD-case 14' which have been rotated with respect to the clip 120 and CD-case 14 by 90°. As can be seen, the swung-out CD-case 14' lies completely clear of the stored clip 120 and case 14. Thus, the rotation by 90° enables the swung-out CD-case 14' to be opened, unobstructed by adjacent stored clips 120 and/or retained CD-cases 14.

Geometrically, it can be shown that the swung-out CD-case 14' does not overlap the CD-case 14 so long as the axis of rotation 150 lies on the opposite side of line 154 from the stored CD-case 14. This line 154 makes an angle of 45° with the edges of the stored CD-case 14 which meet at the corner which is retained by the clip 120. An alternative statement of this geometric arrangement is that a plane 152 containing the axis of rotation 150 and making an angle of 45° with the edges of the stored CD-case which meet at the corner retained by the clip does not pass through the CD-case itself.

Of course, this arrangement does not necessarily result in a CD-case 14' which has been swung-out by 90° lying clear of adjacent clips 120, but owing to the position of the axis of rotation 150, the clips 120 will be cleared, in addition to the stored CD-cases 14, once the swung-out CD-case 14' has been rotated a little further.

FIG. 2 also serves to illustrate the general construction of a standard CD-case 14. The case 14 includes a hinge region 140 which, as can be seen, is grooved. This hinge region does not move with the lid 142 when the lid is opened. The lid includes lateral side walls 144 which engage lateral parts of the hinge region 140. A clearance is shown between the first retaining wall 122 and the gripping member 118 of the clip 120, which permits passage of the lateral side wall 144 of the CD-case's lid 142 when the case is being opened.

Figure 3:
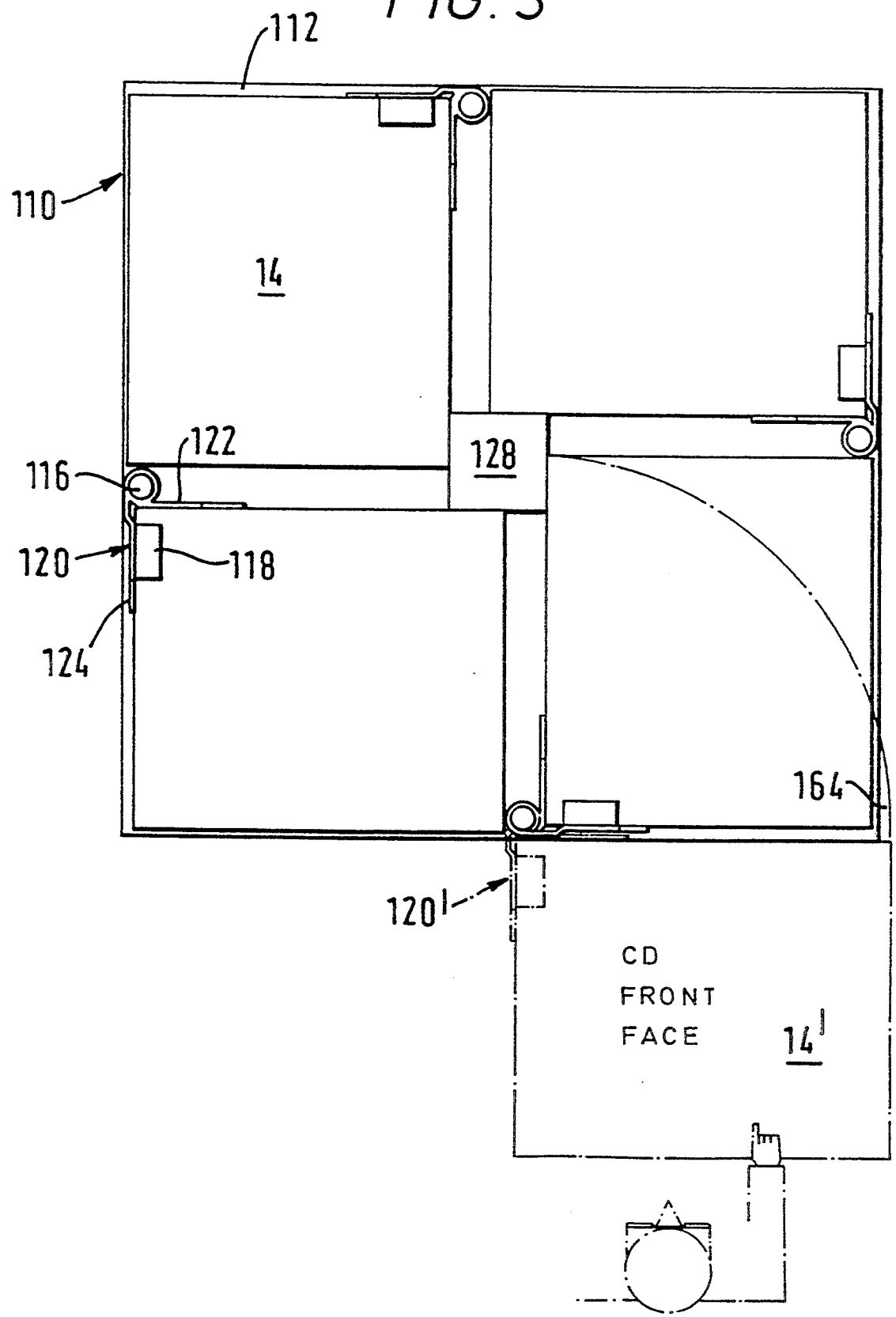
FIG. 3 is a schematic plan view of a storage rack according to the present invention.
Figure 4:
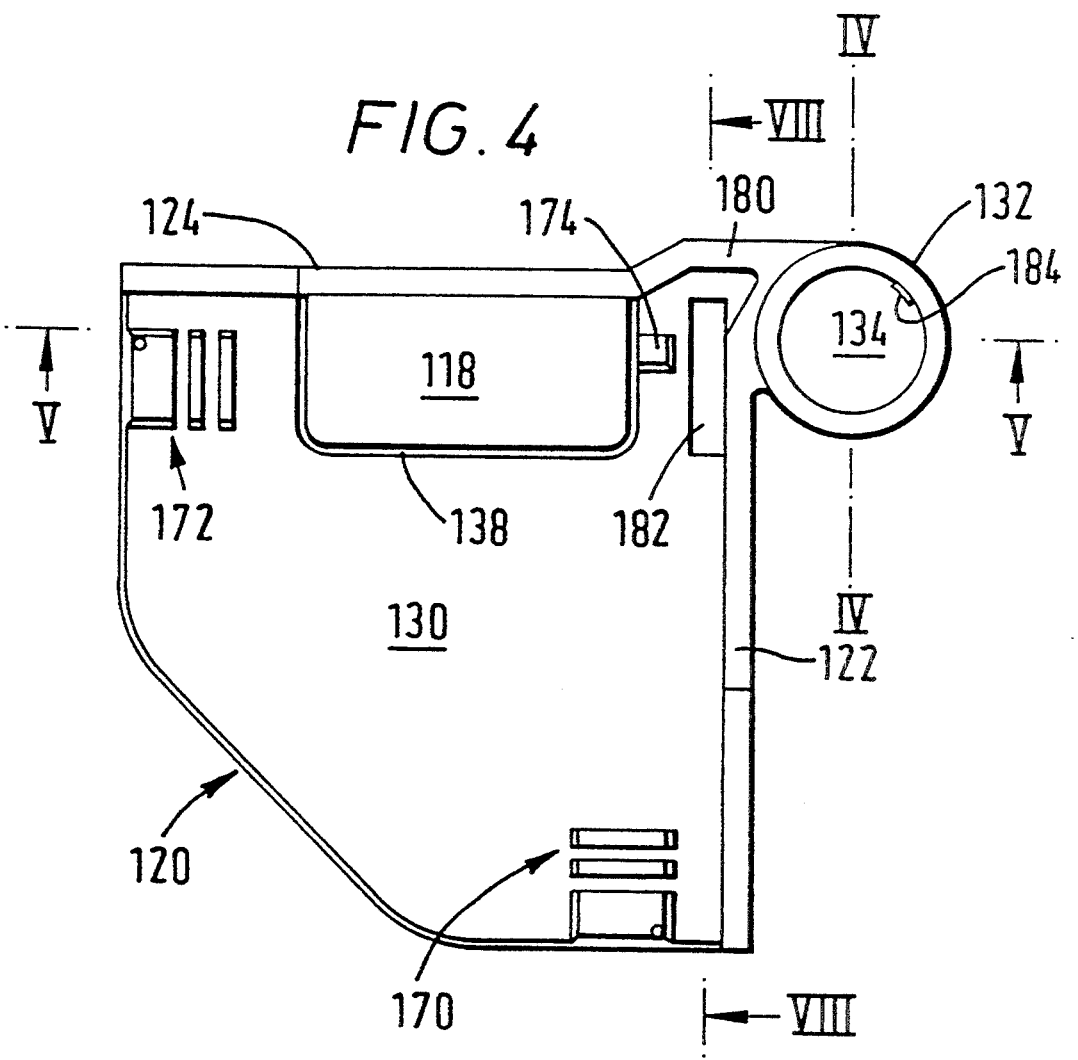
FIG. 4 is a plan view of a storage clip according to the present invention.

FIG. 3 illustrates a storage rack according to the invention. Again, four support rods 116 are provided substantially vertically on a base 112. On each of the support rods there are a plurality of storage clips 120, having the features described above with reference to FIG. 2. At the centre of the rack is a central column 128, against which a CD-case 14 retained in any clip 120 can impinge to define its stored position. A swung-out clip 120' and CD-case 14' are illustrated.

As can be seen from FIG. 3, this design of storage rack enables a CD-case 14 to be swung-out of its associated stack of cases to an angle of no more than about 90°. One result of this is that the rack requires a much smaller foot-print than the existing racks described with reference to FIG. 1. The amount of exterior clearance 164 required is minimal. In addition, the printed matter on a swung-out CD-case 14' runs from left to right, from the user's point of view, making the verification of a selection much more convenient.

Another advantage of the particular embodiment illustrated is that the support rods 116 do not obscure any part of the spines of the retained CD-cases. If the clips themselves are transparent, for example constructed from clear engineering plastic, then the user will gain an unobstructed view of the printed matter on the spines of the CD-cases.

Figure 5:
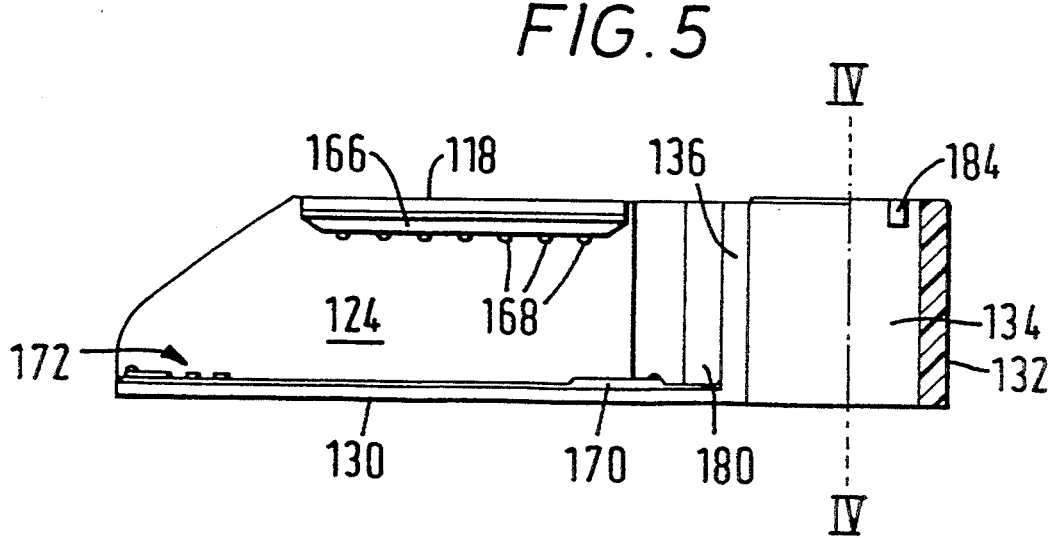
FIG. 5 is a rear view, partly in section, of the clip of FIG. 4.
Figure 6:
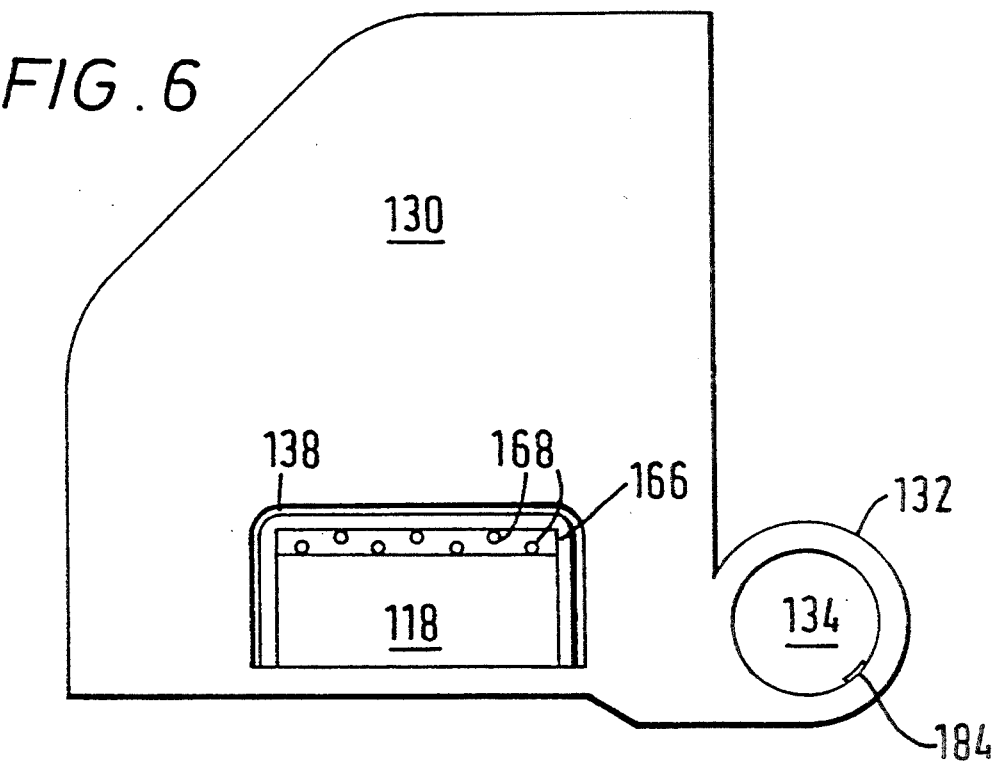
FIG. 6 is a plan view from below of the clip of FIGS. 4 and 5.
Figure 7:
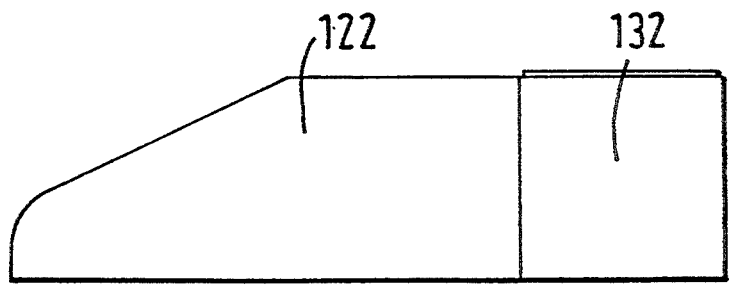
FIG. 7 is a side view of the clip of FIGS. 4 to 6.
Figure 8:
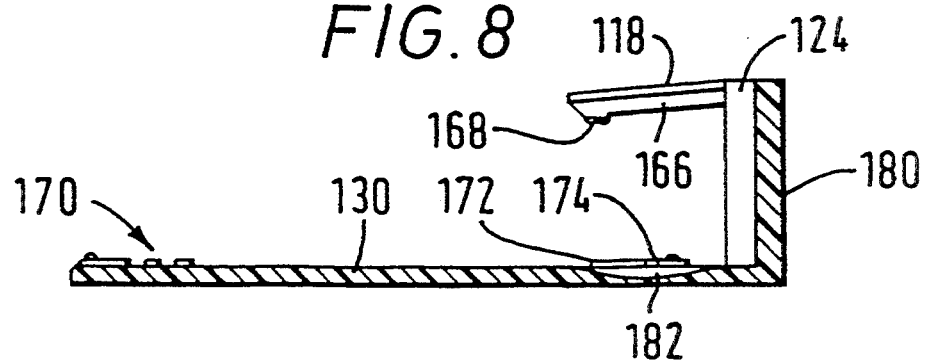
FIG. 8 is a side sectional view of the clip of FIGS. 4 to 7.

A storage clip according to the present invention is illustrated in detail in FIGS. 4–8. FIG. 5 is a part-sectional view of the clip of FIG. 4, with the part of the clip to the right of line IV—IV shown in section, the section being taken along the line V—V. FIG. 8 is a sectional view of the clip of FIG. 4, the section being taken along the line VIII—VIII.

The clip 120 consists of a shelf 130, which supports a retained CD-case from below, a first retaining wall 122 which engages the lateral side of the CD-case, a second retaining wall 124, which engages the spine of the CD-case, and a gripping member 118 which is cantilevered from the second retaining wall. The shelf 130 is provided with an aperture 138, situated below the gripping member 118 and slightly larger in size than the gripping member. As can be seen from FIGS. 5, 6 and 8, the gripping member has a bevelled lower surface 166, which is provided with a plurality of friction dots 168, in the form of small hemispherical projections, which permit the gripping member 118 to engage the grooves formed in the hinge region of the CD-case.

The shelf 130 is provided, adjacent to the distant ends of the first and second retaining walls 122, 124, with raised mouldings 170, 172. These raised mouldings 170, 172 are spaced from their respective retaining walls 122,124 by a predetermined distance. The purpose of the mouldings 170, 172 is to help to retain the CD-case in position. When a CD-case is closed, the lateral and end walls of the hinged lid project below the base of the case by a small distance. The final edge of the base, adjacent the spine of the case, is provided with a projecting bead, which projects by a corresponding distance. The projecting bead is located between one set of mouldings 172 and the second retaining wall 124; a projecting lateral wall of the CD-case is located between the other set of mouldings 170 and the first retaining wall 122. In this way the mouldings 170, 172 serve to locate the CD-case positively and to retain it in place, once located.

An additional moulding 174 is located towards the corner of the clip and serves the same purpose as the aforementioned mouldings 170, 172.

Adjacent to the corner of the clip, the second retaining wall 124 includes a stepped back portion 180. The portion 180 is stepped back to allow a retained CD-case to be opened. If this portion 180 were not stepped back, then a corner of the lid of the CD-case would impinge upon it, thus preventing the case from being opened. Similarly, the shelf 130 is provided, towards the corner of the clip, with a recess 182, best seen in FIG. 8, with a similar purpose. If this recess were absent, a corner of the lid of the CD-case would impinge upon the shelf 130, thus preventing the case from being opened.

The corner of the clip includes an attachment lug 132 with a substantially cylindrical hole 134 passing through it. This hole 134 is adapted to receive a support rod 116, thereby allowing the construction of a CD-rack. The bore of the hole 134 includes an outstanding land 184, which ensures a tight fit on the support rod 116. As has been described with reference to FIG. 2, the positioning of the hole 134 is such as to allow a swung-out CD-case 14' to be opened, unobstructed by adjacent clips 120 and retained CD-cases 14, when it has been rotated with respect to its neighbours by no more than about 90°.

FIGS. 5 and 7 illustrate that the attachment lug 132 is slightly higher than the retaining walls 122,124, thereby ensuring, in a stack of clips, that adjacent clips do not catch on one another during relative rotation.

It will of course be appreciated that the present invention has been described above purely by way of example and that modifications of detail may be made without defaulting from the scope of the invention.

I claim:

1. A storage clip adapted to receive and retain the corner of a CD-case lying in a predetermined first plane relative thereto and to permit the CD-case so retained to be opened, the clip being adapted to form a stack with a plurality of identical clips such that the clips are rotatable relative to one another about a common axis substantially normal to the said plane, wherein a second predetermined plane containing the said axis, and making an angle of 45 degrees with the edges of the CD-case so retained which meet at the said corner, does not pass through the CD-case itself.

2. A storage stack comprising a plurality of clips, rotatable relative to one another about a common axis, each clip being adapted to receive and retain the corner of a CD-case lying in a predetermined first plane substantially normal to the said axis and to permit the CD-case so retained to be opened, and wherein a second predetermined plane containing the said axis, and making an angle of 45 degrees with the edges of the CD-case so retained which meet at the said corner, does not pass through the CD-case itself.

3. A stack according to claim 2, in which a CD-case so retained in any one clip of the stack may be opened, unobstructed by adjacent clips and/or retained CD-cases, once the said one clip has been rotated by 90 degrees relative to its neighbours.

4. A clip or stack according to claim 2, in which the or each clip includes a shelf lying in the first plane and a gripping member cantilevered relative to the shelf and adapted to grip the hinge region of a CD-case to retain the CD-case in the clip.

5. A clip or stack according to claim 4, in which the or each clip includes a first retaining wall substantially perpendicular to and attached to the shelf and adapted to engage a lateral edge of a retained CD-case.

6. A clip or stack according to claim 4, in which the or each clip includes a second retaining wall substantially perpendicular to both the first retaining wall and the shelf and attached to the latter, adapted to engage the spine of a retained CD-case and from which the gripping member is cantilevered.

7. A clip or stack according to claim 6, in which the gripping member is spaced from the first retaining wall to permit a retained CD-case to be opened.

8. A clip or stack according to claim 2, in which the or each clip is adapted to engage an elongate support for rotation about a longitudinal axis of the support, coincident with the said common axis.

9. A clip or stack according to claim 8, in which the or each clip includes an attachment lug with a substantially cylindrical hole centred on the said axis passing through it.

10. A stack according to claim 8 including an elongate support on which the clips may be mounted for rotation about the said axis.

11. A stack according to claim 9 including an elongate support rod about which the clips may be mounted with the support rod passing through the substantially cylindrical hole in each clip.

12. A storage rack comprising a base and a stack according to claim 10, the elongate support being attached to the base and being substantially vertical at rest.

13. A storage rack comprising a base and a plurality of stacks according to claim 10, the elongate supports being arranged around and attached to the base and being substantially vertical at rest.

14. A rack according to claim 13 including a central column, substantially vertical at rest, against which a CD-case retained in any clip in the said plurality of stacks can impinge to define its stored position.

* * * * *